US012123094B2

United States Patent
Oh et al.

(10) Patent No.: US 12,123,094 B2
(45) Date of Patent: *Oct. 22, 2024

(54) ALUMINUM-BASED PLATED STEEL PLATE FOR HOT PRESS HAVING EXCELLENT RESISTANCE AGAINST HYDROGEN DELAYED FRACTURE AND SPOT WELDABILITY, AND METHOD FOR MANUFACTURING SAME

(71) Applicant: POSCO CO., LTD, Pohang-si (KR)

(72) Inventors: Jin-Keun Oh, Gwangyang-si (KR); Seong-Woo Kim, Gwangyang-si (KR); Yeol-Rae Cho, Pohang-si (KR); Sang-Heon Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 52 days.

This patent is subject to a terminal disclaimer.

(21) Appl. No.: 17/297,757

(22) PCT Filed: Nov. 29, 2019

(86) PCT No.: PCT/KR2019/016769
§ 371 (c)(1),
(2) Date: May 27, 2021

(87) PCT Pub. No.: WO2020/111884
PCT Pub. Date: Jun. 4, 2020

(65) Prior Publication Data
US 2022/0049338 A1    Feb. 17, 2022

(30) Foreign Application Priority Data

Nov. 30, 2018   (KR) ........................ 10-2018-0152575
Nov. 29, 2019   (KR) ........................ 10-2019-0156853

(51) Int. Cl.
*B32B 15/10*     (2006.01)
*B32B 15/01*     (2006.01)
(Continued)

(52) U.S. Cl.
CPC .............. *C23C 2/12* (2013.01); *B32B 15/012* (2013.01); *C21D 9/48* (2013.01); *C22C 21/02* (2013.01);
(Continued)

(58) Field of Classification Search
None
See application file for complete search history.

(56) References Cited

U.S. PATENT DOCUMENTS 6,296,805 B1   10/2001   Laurent et al.
10,590,522 B2   3/2020   Oh et al.
(Continued)

FOREIGN PATENT DOCUMENTS

CN    108588612 A  *  9/2018  ........... B21D 22/022
EP    2240622 B1      8/2011
(Continued)

OTHER PUBLICATIONS

Maki et al., machine translation WO 2012/137687, Oct. 11, 2012 (Year: 2012).*
(Continued)

*Primary Examiner* — Mary I Omori
(74) *Attorney, Agent, or Firm* — Morgan, Lewis & Bockius LLP (57) ABSTRACT

The present invention provides an aluminum-based plated steel plate used in hot-press forming, the steel plate comprising: a base steel plate; and a plating layer formed on the base steel plate, wherein the plating layer comprises: an alloying layer formed on the surface of the base steel plate and including one or more of Fe 3Al, FeAl(Si), Fe 2Al 5, and
(Continued)

FeAl 3; and an aluminum layer formed on the alloying layer and having a thickness less than 10% of the thickness of the plating layer, and the plating layer has a thickness of 5-20 μm and an oxygen content of 10 weight % or less, as measured by GDS, at a depth of 0.1 μm from the surface of the plating layer.

11 Claims, 3 Drawing Sheets

(51) Int. Cl.
*C21D 9/48* (2006.01)
*C22C 21/02* (2006.01)
*C22C 38/00* (2006.01)
*C22C 38/02* (2006.01)
*C22C 38/04* (2006.01)
*C22C 38/06* (2006.01)
*C22C 38/28* (2006.01)
*C22C 38/32* (2006.01)
*C23C 2/12* (2006.01)
*C23C 2/28* (2006.01)
*C23C 2/40* (2006.01)

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C23C 2/28* (2013.01); *C23C 2/29* (2022.08); *C23C 2/40* (2013.01)

(56) References Cited

U.S. PATENT DOCUMENTS

| | | | |
|---|---|---|---|
| 2011/0056594 A1 | 3/2011 | Macherey et al. | |
| 2011/0174418 A1 | 7/2011 | Maki et al. | |
| 2011/0300407 A1 | 12/2011 | Cho et al. | |
| 2018/0051366 A1 | 2/2018 | Ooi et al. | |
| 2018/0237900 A1* | 8/2018 | Kobayashi | ............ C23C 28/023 |
| 2019/0003029 A1* | 1/2019 | Oh | .......................... C22C 38/04 |
| 2019/0010597 A1* | 1/2019 | Kim | ........................ C22C 38/02 |
| 2020/0385836 A1* | 12/2020 | Yi | .............................. C21D 7/13 |
| 2021/0039355 A1* | 2/2021 | Mitsunobu | .............. B32B 15/20 |
| 2021/0222276 A1* | 7/2021 | Kim | ...................... C21D 8/0236 |

FOREIGN PATENT DOCUMENTS

| | | | | |
|---|---|---|---|---|
| EP | 3396010 A1 | 10/2018 | | |
| EP | 3889312 A1 | 10/2021 | | |
| JP | H09-310163 A | 12/1997 | | |
| JP | 2003-049256 A | 2/2003 | | |
| JP | 2003181549 A | * 7/2003 | | .............. C23C 2/12 |
| JP | 2009-264692 A | 11/2009 | | |
| JP | 2010-018860 A | 1/2010 | | |
| JP | 2012-041610 A | 3/2012 | | |
| JP | 6059408 B1 | 12/2016 | | |
| KR | 10-2010-0011688 A | 2/2010 | | |
| KR | 10-2010-0082537 A | 7/2010 | | |
| KR | 10-2011-0018420 A | 2/2011 | | |
| KR | 10-2015-0075435 A | 7/2015 | | |
| KR | 20150075435 A | * 7/2015 | | |
| KR | 101696121 B1 | * 1/2017 | | |
| KR | 101746996 B1 | * 6/2017 | | |
| KR | 10-2018-0074292 A | 7/2018 | | |
| WO | WO-2012137687 A1 | * 10/2012 | | .............. B21B 1/26 |
| WO | 2018/158165 A1 | 9/2018 | | |
| WO | WO-2019180853 A1 | * 9/2019 | | .......... B21D 22/022 |
| WO | WO-2019231023 A1 | * 12/2019 | | ......... B23K 35/0238 |

OTHER PUBLICATIONS

Cho et al., machine translation of KR 20150075435 Description, Jul. 6, 2015 (Year: 2015).*
Aluminized Steel Sheet Coated (Type 2 Hot Dip) Aliotas (Year: 2024).*
Indian Office Action dated Feb. 24, 2022 issued in Indian Patent Application No. 202117028425 (English translation).
International Search Report dated Apr. 9, 2020 issued in International Patent Application No. PCT/KR2019/016769 (with English translation).
Japanese Office Action dated Apr. 5, 2022 issued in Japanese Patent Application No. 2021-529861.
Extended European Search Report dated Oct. 20, 2021 issued in European Patent Application No. 19890935.0.

* cited by examiner

ALUMINUM-BASED PLATED STEEL PLATE FOR HOT PRESS HAVING EXCELLENT RESISTANCE AGAINST HYDROGEN DELAYED FRACTURE AND SPOT WELDABILITY, AND METHOD FOR MANUFACTURING SAME

CROSS-REFERENCE OF RELATED APPLICATIONS

This application is the U.S. National Phase under 35 U.S.C. § 371 of International Patent Application No. PCT/KR2019/016769, filed on Nov. 29, 2019, which in turn claims the benefit of Korean Application Nos. 10-2018-0152575, filed on Nov. 30, 2018 and 10-2019-0156853, filed on Nov. 29, 2019, the entire disclosures of which applications are incorporated by reference herein.

TECHNICAL FIELD

The present disclosure relates to an aluminum-based steel sheet for hot press forming having excellent resistance to hydrogen delayed fracture and spot weldability, and method for manufacturing the same.

BACKGROUND ART

In recent years, due to depletion of petroleum energy resources and high interest in the environment, regulations on improving fuel efficiency of automobiles have been strengthened. In terms of materials, reducing a thickness of a steel sheet used in automobiles may be a method for improving fuel efficiency of automobiles. However, reducing the thickness of a steel sheet may cause problems in automobile safety, and thus, in this case, improvements of strength of the steel sheet should be facilitated.

Thus, there has been continuous demand for high-strength steel sheets, and various kinds of steel sheets have been developed. However, since these steel sheets have high strength in themselves, workability thereof is poor. That is, since a product of strength and elongation for each grade of steel sheet tends to always have a constant value, when strength of the steel sheet increases, there maybe a problem that elongation, an index of workability, decreases.

In order to solve this problem, a hot press forming method has been proposed. The hot press forming method is a method forming a low temperature structure, such as martensite, in a steel sheet by forming at a high temperature suitable for forming and then quenching the steel sheet at a low temperature to increase the strength of the final product. In this case, there is advantage that the problem of workability may be minimized when manufacturing a member having high strength.

However, in the case of the aforementioned hot press forming method, since the steel sheet has to be heated to a high temperature, a surface of the steel sheet is oxidized, which additionally requires a process of removing oxides on the surface of the steel sheet after press forming. In order to solve this problem, patent document 1 was proposed. In this document, a steel sheet subjected to aluminum plating is used in a process of hot press forming or heating and quenching after room temperature forming (briefly, post-heat treatment). Since an aluminum plating layer is present on the surface of the steel sheet, the steel sheet is not oxidized at the time of heating.

Meanwhile, when subjected to hot press forming, the steel sheet may have a strength of 1000 MPa or more, and in some cases, 1400 MPa or more. In recent years, the required level for strength has been further increased, and a steel sheet may have strength of 1800 MPa or more. However, when strength of the steel sheet is increased, the steel sheet becomes sensitive to hydrogen delayed fracture, so even when a small amount of hydrogen is contained, the steel sheet may be fractured. In addition, in the case of hot press forming of an aluminum-plated steel sheet, Fe diffuses from a base steel of the steel sheet to the plating layer on the surface, resulting in alloying in the plating layer (an alloying layer could be formed), and hydrogen penetrated during hot press forming cannot easily escape due to the alloying layer, so that hydrogen resistance properties of the hot press formed member become inferior.

(Patent document 1) U.S. Pat. No. 6,296,805

DISCLOSURE

Technical Problem

An aspect of the present disclosure may provide an aluminum-based plated steel sheet for hot press forming having excellent resistance to hydrogen delayed fracture and spot weldability, and a method for manufacturing the same.

The technical problem of the present disclosure is not limited to the aforementioned contents. A person skilled in the art to which the present disclosure pertains will not have any difficulty in understanding the additional technical problem of the present disclosure from the general details of the present disclosure.

Technical Solution

According to an aspect of the present disclosure, an aluminum-based plated steel sheet comprises: a base steel sheet; and a plating layer formed on a surface of the base steel sheet, wherein the plating layer comprises: an alloying layer formed on a surface of the base steel sheet and comprising at least one of $Fe_3Al$, $FeAl(Si)$, $Fe_2Al_5$, and $FeAl_3$; and an aluminum layer formed on the alloying layer and having a thickness less than 10% of the thickness of the plating layer, wherein the thickness of the plating layer is 5 μm to 20 μm and oxygen measured by a glow discharge spectrometer (GDS) at a depth of 0.1 μm from a surface of the plating layer is 10 wt % or less.

The plating layer may include, by wt %, more than 4% and 15% or less of silicon (Si), a balance of aluminum (Al) and other inevitable impurities when an alloy composition excluding an iron (Fe) content diffused from the base steel sheet is 100%.

The plating layer may additionally include, by wt %, 1.1% or less of Mg.

The base steel sheet may include, by wt %, 0.04% to 0.5% of carbon (C), 0.01% to 2% of silicon (Si), 0.01% to 10% of manganese (Mn), 0.001% to 1.0% of aluminum (Al), 0.05% or less of phosphorus (P), 0.02% or less of silicon (S), 0.02% or less of nitrogen (N), a balance of iron (Fe), and other inevitable impurities.

The base steel sheet may further include one or more of 0.01% to 4.0% of the sum of one or more selected from the group consisting of chromium (Cr), molybdenum (Mo), and tungsten (W); 0.001% to 0.4% of the sum of one or more selected from the group consisting of titanium (Ti), niobium (Nb), zirconium (Zr), and vanadium (V); 0.005% to 2.0% of copper (Cu)+nickel (Ni); 0.001% to 1.0% of antimony (Sb)+tin (Sn); and 0.0001% to 0.01% of boron (B).

According to another aspect of the present disclosure, a hot press formed member, as a hot press formed member obtained by hot press forming the aforementioned aluminum-based plated steel sheet, wherein a diffusion layer consisted of at least one of FeAl(Si) and $Fe_3Al$ is formed on the base steel sheet and a thickness of the diffusion layer is 90% or more of an entire thickness of the plating layer.

A content of diffusible hydrogen in the hot press formed member may be 0.1 ppm or less, and a spot welding current range of the hot press formed member may be 1 kA or more.

According to another aspect of the present disclosure, a method of manufacturing an aluminum-based plated steel sheet includes: preparing a base steel sheet; dipping the base steel sheet in an aluminum plating bath including, by wt %, more than 4% and 15% or less of silicon (Si), a balance of Al, and other inevitable impurities to plate the base steel sheet with a coating amount of 10 to 40 g/m² per side to obtain an aluminum plated steel sheet; performing initial cooling at a cooling rate of 0.1 to 5° C./second up to a temperature of 640° C. or higher immediately after the aluminum plating; and obtaining an aluminum-based plated steel sheet through on-line alloying of performing a heat treatment by maintaining 1 to 20 seconds within a heating temperature range of 670° C. to 900° C. successively after the initial cooling.

The aluminum plating bath may additionally include, by wt %, 1.1% or less of magnesium (Mg).

Advantageous Effects

As described above, in the present disclosure, by adjusting the Si content of the aluminum plating bath, appropriately controlling a thickness of the plating layer, and then alloying the same in the aluminum-based plated steel sheet before hot press forming, a plating layer mostly formed of a diffusive layer may be formed on the base steel sheet in the hot press formed member, thereby improving hydrogen resistance and spot weldability of the hot press formed member.

In addition, by controlling the Si content in the composition of the plating bath and forming the plating layer to be thin, an on-line alloying heat treatment is enabled to perform a heat treatment successively immediately after the formation of the plating layer, thereby providing a method for manufacturing an aluminum-based plated steel sheet reduced at manufacturing cost and improve in productivity.

BEST MODE FOR INVENTION

Hereinafter, an aluminum-based plated steel sheet for hot pressing according to an aspect of the present disclosure will be described in detail. In the present disclosure, it should be appreciated that the content of each element refers to percent by weight (wt %), unless otherwise specified. In addition, the ratio of grains or microstructures is based on area unless otherwise indicated.

[Aluminum-Based Plated Steel Sheet]

An aluminum-based plated steel sheet (or an aluminum-based plated steel plate) according to an embodiment of the present disclosure comprises a base steel sheet and a plating layer formed on a surface of the base steel sheet, wherein the plating layer comprises: an alloying layer formed on a surface of the base steel sheet and comprising at least one of $Fe_3Al$, FeAl(Si), $Fe_2Al_5$, and $FeAl_3$ and an aluminum layer formed on the alloying layer and having a thickness less than 10% of the thickness of the plating layer, wherein the thickness of the plating layer is 5 μm to 20 μm and oxygen measured by GDS at a depth of 0.1 μm from a surface of the plating layer is 10 wt % or less.

First, the aluminum-based plated steel sheet according to an embodiment of the present disclosure includes a base steel sheet and a plating layer formed on a surface of the base steel sheet. In addition, the plating layer comprises an alloying layer formed on a surface of the base steel sheet and comprising at least one of $Fe_3Al$, FeAl(Si), $Fe_2Al_5$, and $FeAl_3$, and an aluminum layer formed on the alloying layer.

According to an embodiment of the present disclosure, the alloying layer may comprise at least one of $Fe_3Al$, FeAl(Si), $Fe_2Al_5$, and $FeAl_3$. In addition, the alloying layer may mainly comprise at least one of $Fe_3Al$, FeAl(Si), $Fe_2Al_5$, and $FeAl_3$.

Specifically, according to an embodiment of the present disclosure, the alloying layer may comprise 50% or more of at least one of $Fe_3Al$, FeAl(Si), $Fe_2Al_5$, and $FeAl_3$, preferably, 80% or more, more preferably, 90% or more, and most preferably, 95% or more.

That is, according to an embodiment of the present disclosure, the alloying layer mainly comprises alloy phases of at least one of $Fe_3Al$, FeAl(Si), $Fe_2Al_5$, and $FeAl_3$ and may also comprise inevitably included impurities and small amounts of other elements liable to be included in the plating bath.

For example, in the present disclosure, when Mg is added, Mg may be partially comprised in the Al—Fe-based alloy phase in the alloying layer, or the alloying layer may include other alloy phases comprising Al—Fe—Mg-based alloy phase.

When an alloying heat treatment is performed after the base steel sheet is coated with aluminum, Fe of the base steel sheet is diffused into the aluminum plating layer having a high Al content. As a result, an alloying layer mainly comprising an intermetallic compound of Al and Fe may be formed as a result of diffusion on the base steel sheet. Although not limited thereto, examples of the alloy phases of the Al—Fe-based intermetallic compound that mainly constitutes the alloying layer comprise $Fe_3Al$, FeAl(Si), $Fe_2Al_5$, $FeAl_3$, and so on. An aluminum layer, which is the same as a component of the plating layer or comprises a small amount of Fe diffused from the base steel sheet, may be present on the aforementioned alloying layer, and in some cases, the aluminum layer may not be present due to complete alloying.

A thickness of the plating layer may be 5 μm to 20 μm. If the thickness of the plating layer is less than 5 μm, corrosion resistance is decreased, whereas if the thickness of the plating layer exceeds 20 μm, weldability is deteriorated. Therefore, in the present disclosure, the thickness of the alloy plating layer is preferably limited to a thickness of 5 μm to 20 μm. Meanwhile, a thickness of the plating layer may be preferably 6.2 μm to 19.5 μm, more preferably 5 μm to 15 μm.

Meanwhile, oxygen measured by the GDS at a depth of 0.1 μm from the surface of the plating layer may be 10 wt % or less, more preferably, 7.4 wt % or less. That is, in the present disclosure, a smaller amount of oxygen measured by the GDS at the depth of 0.1 μm from the surface of the plating layer is advantageous, and thus, a lower limit may not be particularly limited. However, according to an exemplary embodiment of the present disclosure, oxygen measured by the GDS at a depth of 0.1 μm from the surface of the plating layer, including an error range, may be greater than 0% and less than or equal to 10% by weight, or greater than 0% and less than or equal to 7.4%.

In the present disclosure, when alloying the aluminum plating layer, an alloying heat treatment is performed within a short time by increasing a temperature without cooling after hot-dip aluminum plating, and thus, it is possible to effectively suppress an increase in an oxygen content of the surface of the plating layer. If the oxygen content of the surface of the plating layer exceeds 10 wt %, a surface quality of the plated steel sheet may be deteriorated. Meanwhile, since a smaller oxygen content on the surface of the plating layer is advantageous, a lower limit of the oxygen content may not be particularly limited.

Meanwhile, an aluminum layer mainly formed of aluminum may be formed on the surface side of the plating layer and on the alloying layer. In the present disclosure, a thickness of the aluminum layer may be controlled to be less than 10% of a thickness of the plating layer, and in some cases, sufficient alloying may be performed and aluminum layer may not exist (that is, 0% of the thickness of the plating layer is also included). Since an interface between the aluminum layer and the alloying layer in the aluminum-based plated steel sheet is unstable, if the thickness of the aluminum layer is greater than 10% of the thickness of the plating layer, peeling of the aluminum layer may occur when coiling after the alloying heat treatment. Meanwhile, a lower thickness of the aluminum layer is desirable, and thus, a lower limit of the thickness of the aluminum layer may not be particularly limited. Meanwhile, since the lower thickness of the aluminum layer is desirable, the thickness of the aluminum layer may be preferably less than 5%, more preferably less than 1%, and most preferably 0%.

According to an embodiment of the present disclosure, the plating layer may include, by wt %, when a remaining alloy composition excluding an Fe content diffused from the base steel sheet is 100%, more than 4% and 15% or less of silicon (Si), a balance of aluminum (Al), and other inevitable impurities. Silicon (Si) serves to make alloying with Fe uniform in the plating layer, and in order to obtain such an effect, silicon (Si) should be contained in an amount exceeding at least 4%. Meanwhile, since Si also serves to suppress diffusion of Fe, if silicon is contained in excess of 15%, diffusion of Fe may be excessively suppressed and a plating layer structure desired in the present disclosure may not be obtained. The Si content may be preferably 4.5% to 14.1%, more preferably 6% to 13%, and most preferably 8% to 11%.

In addition, as a non-limiting embodiment, the plating layer may optionally further include 1.1% or less of Mg by wt %. When Mg is added, Mg serves to improve corrosion resistance of the plated steel sheet, and an effect of increasing an alloying rate may also be obtained. However, if the Mg content exceeds 1.1%, a large amount of Mg oxide may occur on the surface after alloying and/or hot press forming, resulting in deterioration of weldability, and thus, in the present disclosure, the Mg content may be limited to be 1.1% or less. Further, the Mg content may be preferably limited to be 0.9% or less, and in some cases, the Mg content may be limited to be 0.1% or less. In addition, in some cases, the plating layer may not contain Mg.

According to an embodiment of the present disclosure, the base steel sheet, as a steel sheet for hot press forming, may not be particularly limited when used in hot press forming. However, as a non-limiting example, the base steel sheet may have a composition including, by wt %, 0.04% to 0.5% of carbon (C), 0.01% to 2% of silicon (Si), 0.01% to 10% of manganese (Mn), 0.001% to 1.0% of aluminum (Al), 0.05% or less of phosphorus (P), 0.02% or less of silicon (Si), and 0.02% of less of nitrogen (N).

C: 0.04% to 0.5%

Carbon (C) may be added in an appropriate amount as an essential element to increase strength of a heat treatment member. That is, in order to ensure sufficient strength of the heat treatment member, C may be added in an amount of 0.04% or more. Preferably, a lower limit of the C content may be 0.1% or more. However, if the C content is too high, when a cold rolled material is produced, strength of a hot rolled material is too high when cold rolling the hot rolled material, and thus, cold rolling property may be significantly deteriorated and spot weldability may be significantly lowered. Therefore, in order to ensure sufficient cold rolling property and spot weldability, carbon (C) may be added in an amount of 0.5% or less. Also, the C content may be 0.45% or less, and more preferably, the C content may be limited to be 0.4% or less.

Si: 0.01% to 2%

Silicon (Si) should be added as a deoxidizer in steel making and also serves to inhibit an occurrence of a carbide, which has the greatest effect on strength of the hot rolled press formed member. In the present disclosure, Si may be added in an amount of 0.01% or more to secure residual austenite by concentrating carbon at martensite lath grain boundaries after the formation of martensite in hot press forming. In addition, an upper limit of the Si content may be set to 2% to ensure sufficient plating properties when performing aluminum plating on the steel sheet after rolling. Preferably, the Si content may be limited to 1.5% or less.

Mn: 0.01% to 10%

Manganese (Mn) may be added in an amount of 0.01% or more to lower a critical cooling rate for securing martensite in the hot press-formed member, as well as securing a solid solution strengthening effect. In addition, the Mn content may be limited to 10% or less in that hot press forming process workability is secured, manufacturing cost is reduced, and spot weldability is improved by appropriately maintaining strength of the steel sheet. Preferably, the Mn content may be 9% or less, and in some cases, 8% or less.

Al: 0.001% to 1.0%

Aluminum (Al) may increase cleanliness of the steel by deoxidizing the steel together with Si and may be added in an amount of 0.001% or more to obtain the above effect. In addition, the content of Al may be limited to 1.0% or less to prevent the Ac3 temperature from becoming too high so that heating required during hot press forming may be performed within an appropriate temperature range.

P: 0.05% or less

Phosphorus (P) is present as an impurity in the steel and a less content thereof is advantageous. Accordingly, in the present disclosure, the P content may be limited to 0.05% or less, and preferably, may be limited to 0.03% or less. Since a smaller amount of P is advantageous, there is no need to specifically set an upper limit of the content. However, excessive lowering the P content may lead to an increase in manufacturing cost, and in consideration of this, a lower limit of the P content may be set to 0.001%.

S: 0.02% or less

Since sulfur (S) is an impurity in the steel and is an element that inhibits ductility, impact characteristics and weldability of the member, and thus, a maximum content of S is limited to 0.02%, and preferably, to 0.01% or less. In addition, if a minimum content thereof is less than 0.0001%, manufacturing cost may increase, so a lower limit of the S content may be set to 0.0001%.

N: 0.02% or less

Nitrogen (N) is an element included as an impurity in the steel. In order to reduce sensitivity to crack occurrence and secure impact characteristics during continuous slab casting, and, a lower content thereof is more advantageous, and therefore, N may be included in an amount of 0.02% or less. Although it is not necessary to set a lower limit, the N content may be set to 0.001% or more in consideration of an increase in manufacturing cost.

In the present disclosure, optionally as necessary, in addition to the aforementioned steel composition, 0.01% to 4.0% of the sum of one or more selected from the group consisting of Cr, Mo, and W; 0.001% to 0.4% of the sum of one or more selected from the group consisting of Ti, Nb, Zr, and V; 0.005% to 2.0% of Cu+Ni; 0.001% to 1.0% of Sb+Sn; and 0.0001% to 0.01% of B may be additionally added.

The sum of one or more selected from the group consisting of Cr, Mo and W: 0.01% to 4.0%

Since the Cr, Mo and W may secure strength and grain refinement through the improvement of hardenability and precipitation strengthening effect, one or more thereof may be added by 0.01% or more based on the total content. In addition, in order to secure weldability of the member, the content may be limited to 4.0% or less. In addition, if the content of these elements exceeds 4.0%, the effect is saturated, so the content may be limited to 4.0% or less.

The sum of one or more selected from the group consisting of Ti, Nb, Zr, and V: 0.001% to 0.4%

The Ti, Nb, and V are effective in improving the steel sheet of the heat treatment member by forming fine precipitates, stabilizing residual austenite and improving impact toughness by grain refinement, so one or more thereof may be added by 0.001% or more based on the total content. However, if the added amount exceeds 0.4%, the effect may be saturated and cost may increase due to excessive addition of ferroalloy.

Cu+Ni: 0.005% to 2.0%

Copper (Cu) and nickel (Ni) are elements that improve strength by forming fine precipitates. In order to obtain the aforementioned effect, the sum of one or more of these components may be 0.005% or more. However, if the value exceeds 2.0%, cost may excessively increased, and thus, an upper limit thereof may be set at 2.0%.

Sb+Sn: 0.001% to 1.0%

Antimony (Sb) and tin (Sn) are concentrated on the surface during an annealing heat treatment for Al—Si plating to inhibit the formation of Si or Mn oxide on the surface, thereby improving plating properties. 0.001% or more may be added to obtain such an effect. However, an addition amount exceeding 1.0% may incur excessive ferroalloy cost and cause Sb and Sn to be dissolved along grain boundaries of a slab to cause coil edge cracks during a hot rolling process. Thus, an upper limit thereof is set to 1.0%.

B: 0.0001% to 0.01%

The addition of even a small amount of boron (B) improves hardenability. B segregates along prior-austenite grain boundaries to inhibit embrittlement of a hot press formed member based on grain boundary segregation of P and S. Thus, B may be added by 0.0001% or more. If the boron content exceeds 0.01%, the effect is saturated and causes brittleness at hot rolling, and thus, an upper limit of the boron content may be set to 0.01%, and in an implementation example, the boron content may be set to 0.005% or less.

The balance other than the aforementioned components may include iron (Fe) and inevitable impurities, and addition of a component that may be included in the steel sheet for hot press forming may not be particularly limited.

When the aluminum-based plated steel sheet consisting of the plating layer of the aforementioned configuration is heat-treated in a temperature range of 880° C. to 950° C. for 3 to 10 minutes and then hot press-formed to produce a hot press-formed member, at least 90% of the plating layer may be formed as a diffusion layer formed of one of more of FeAlSi and $Fe_3Al$, and thus, hydrogen that has penetrated into the steel material may easily escape during hot press forming and diffusive hydrogen content in the steel material satisfies 0.1 ppm or less, thereby improving hydrogen resistance. In addition, a spot welding current range satisfies 1 kA or more, so that spot weldability may be improved.

Next, a method of manufacturing an aluminum-based plated steel sheet for hot press forming according to another aspect of the present disclosure will be described in detail. However, the following method of manufacturing an aluminum-based plated steel sheet for hot press forming is only an example and it does not mean that the aluminum-based plated steel sheet for hot press forming according to the present disclosure must be manufactured by this manufacturing method. It should be appreciated that any method may be used to implement each embodiment of the present disclosure if it satisfies the claims of the disclosure.

[Method of Manufacturing Aluminum-Based Plated Steel Sheet]

An aluminum-based plated steel sheet according to another aspect of the present disclosure may be obtained by performing aluminum plating on a surface of a hot rolled or cold rolled base steel sheet with a coating amount of 10-40 $g/m^2$ per side using an aluminum plating bath including, by wt %, more than 4% and 15% or less of silicon, a balance of aluminum (Al), and other inevitable impurities; performing initial cooling successively after the plating, and performing on-line alloying by immediately performing a heat treatment.

Step of Obtaining Aluminum Plated Steel Sheet

In an embodiment of the present disclosure, a base steel sheet is prepared and immersed in an aluminum plating bath including more than 4% and 15% or less of Si, a balance of aluminum, and other inevitable impurities to plate a surface of the base steel sheet with aluminum with a coating amount of 10 to 40 $g/m^2$ per side to obtain an aluminum plated steel sheet. Meanwhile, more preferably, the coating amount may be 15 to 38 $g/m^2$ per side. In addition, annealing may be selectively performed on the steel sheet before plating.

Si is an element that plays a role of making alloying with Fe uniform in the plating layer and may be contained in excess of at least 4% in order to obtain the effect. However, since Si plays a role of inhibiting diffusion of Fe, if Si is contained in excess of 15%, an alloying rate may be lowered, making it difficult to obtain sufficient alloying. Therefore, the Si content contained in the plating bath in the present disclosure may be limited to more than 4% and 15% or less. Meanwhile, the Si content may be preferably 4.5% to 14.1%, more preferably 6% to 13%, and most preferably 8% to 11%.

Meanwhile, as a non-limiting embodiment, Mg may be selectively added to the aluminum plating bath. Mg serves to improve corrosion resistance of the aluminum-based plated steel sheet and also serves to increase an alloying rate. However, if Mg is contained in an amount exceeding 1.1%, a large amount of Mg oxide may be generated on the surface after alloying and/or hot press forming, resulting in deterioration of weldability. Therefore, the Mg content optionally included in the present disclosure may be limited to 1.1% or less. Meanwhile, more preferably, Mg may be limited to 0.9% or less, and in some cases, Mg may be limited to 0.1% or less. In addition, in some cases, the plating bath may not contain Mg.

Initial Cooling Step

After the aluminum plating, initial cooling may be performed at a cooling rate of 0.1 to 5° C./sec to a temperature range of 640° C. or higher. In addition, the initial cooling may be more preferably performed in a temperature range of 640° C. to 680° C. (Cooling termination temperature) and the cooling rate may be 1° C. to 4° C./sec.

In the present disclosure, the initial cooling after aluminum plating is important in that it is a means for forming a uniform alloy layer. If a cooling termination temperature is lower than 640° C., higher power may need to be applied for allying in a subsequent on-line alloying heat treatment, causing a equipment load.

Meanwhile, if the cooling rate is less than 0.1° C./sec, a solidification layer is not sufficiently generated on the plating surface, so that non-uniform alloying proceeds during online alloying, which may cause a problem that surface characteristics of the steel sheet are deteriorated. Meanwhile, if the cooling rate exceeds 5° C./sec, the plating layer may be excessively cooled, so that the equipment load and time are lengthened to secure a predetermined temperature for alloying, which may hinder productivity.

Step of Obtaining Aluminum-Based Plated Steel Sheet by Alloying Heat Treatment

After the initial cooling, an on-line alloying treatment in which a heat treatment is performed continuously immediately after the initial cooling may be performed. In addition, a heating temperature range during the alloying heat treatment may be 670° C. to 900° C., and a holding time may be 1 to 20 seconds.

Figure 1:
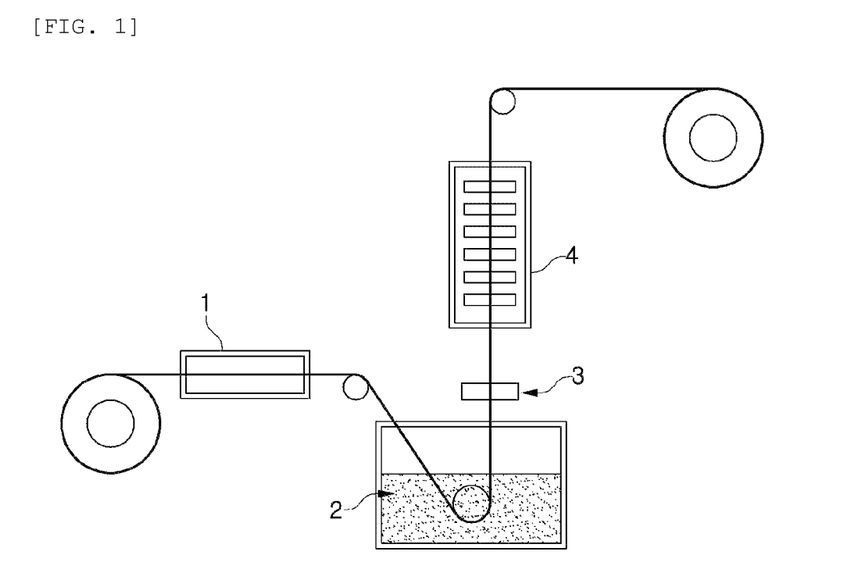
FIG. 1 schematically shows a manufacturing apparatus implementing a manufacturing method according to an aspect of the present disclosure.
Figure 2:
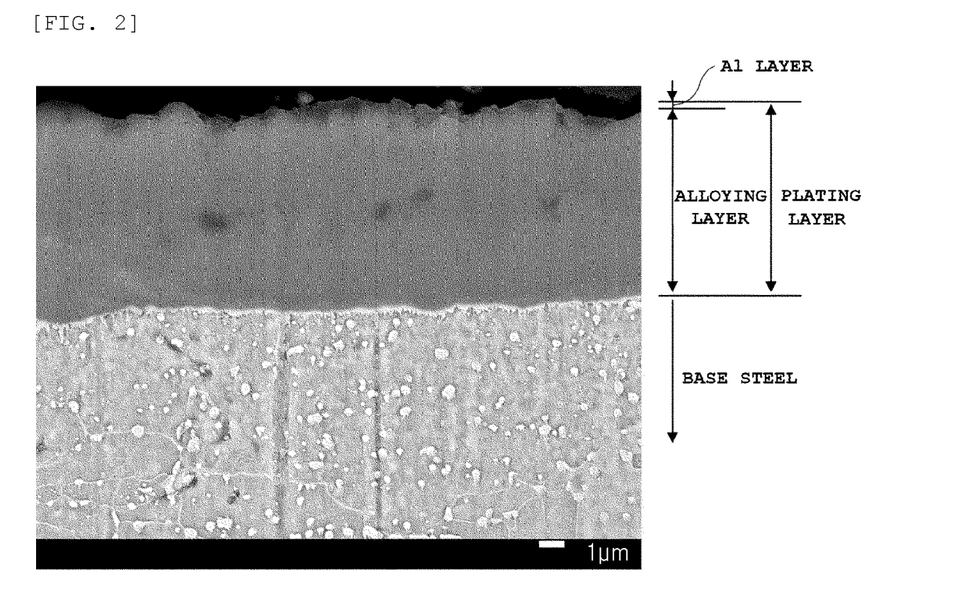
FIG. 2 is a photograph of a cross-section of an aluminum-based plated steel sheet manufactured according to Inventive Example 4, observed with a scanning electron microscope (SEM).
Figure 3:
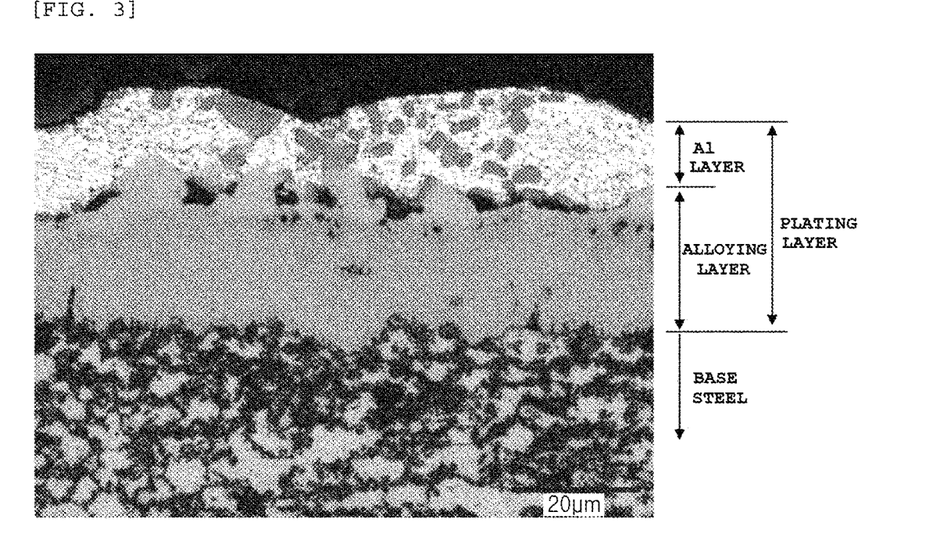
FIG. 3 is a photograph of a cross-section of an aluminum-based plated steel sheet manufactured by Comparative Example 7, observed with an optical microscope.
Figure 4:
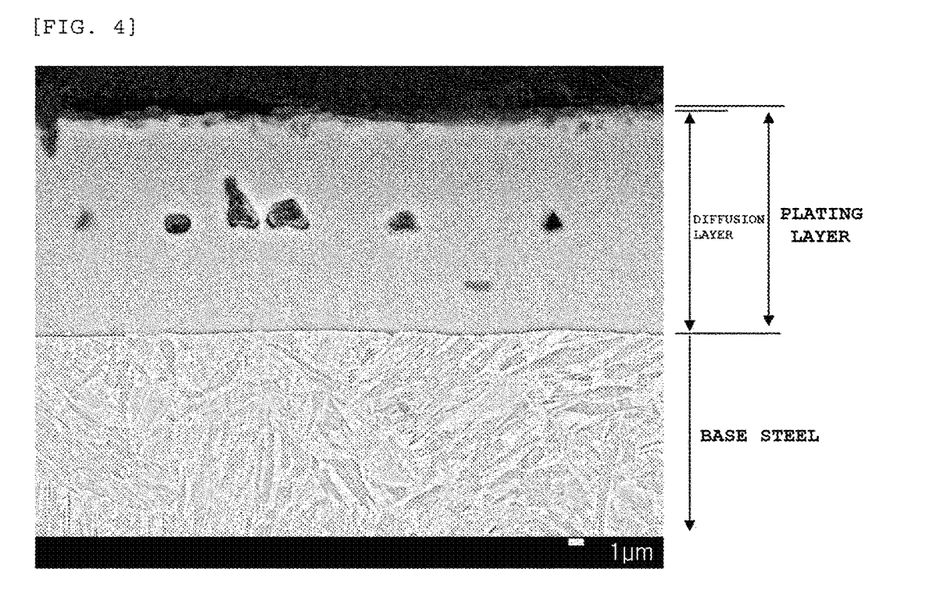
FIG. 4 is a photograph of a cross-section of a plating layer (coating layer) after hot press forming an aluminum-based plated steel sheet manufactured according to Inventive Example 4, observed with an SEM.
Figure 5:
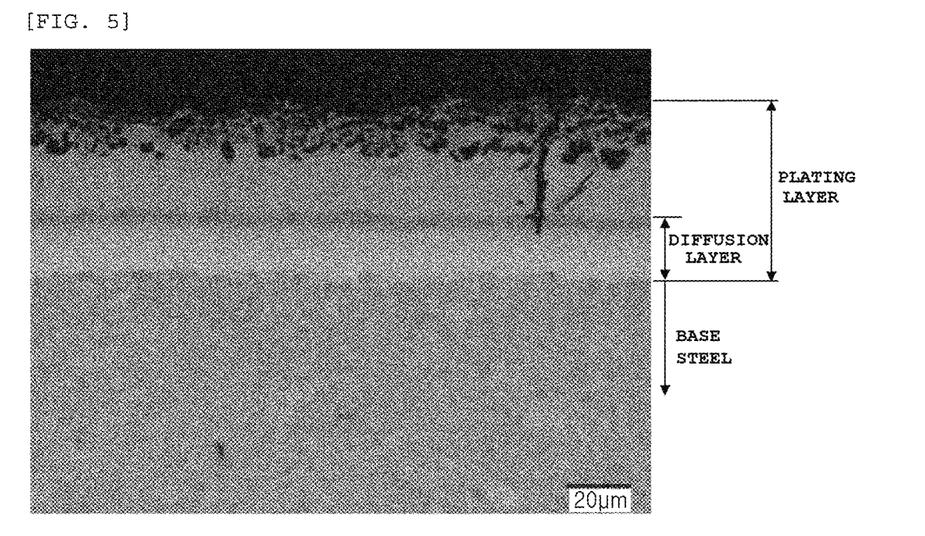
FIG. 5 is a photograph of a cross-section of a plating layer after hot press forming an aluminum-based plated steel sheet prepared according to Comparative Example 7, observed with an optical microscope.

In the present disclosure, the online alloying treatment refers to a process of heat treatment by heating after hot-dip aluminum plating, as can be seen in the schematic diagram shown in FIG. 1. In the on-line alloying heat treatment method according to the present disclosure, since the heat treatment for alloying starts before the plating layer is cooled and hardened after hot-dip aluminum plating, alloying may be performed within a short time. In the known plating layer component system of an aluminum-plated steel sheet, it was difficult to apply the on-line alloying method of performing a heat treatment immediately after plating because the alloying rate was low and sufficient alloying could not be completed within a short time. In contrast, in the present disclosure, alloying of the aluminum plating layer may be effectively completed despite a short heat treatment time of 1 to 20 seconds by adjusting the plating bath components that affect the alloying rate, in particular, by controlling the Si content and by forming the plating layer to be thinner.

The heating temperature is based on a surface temperature of the steel sheet to be heat-treated. If the heating temperature is lower than 670° C., insufficient alloying may occur. Meanwhile, if the heating temperature exceeds 900° C., it is difficult to cool after alloying, and if the cooling rate is increased, strength of the base steel sheet may become too high. Therefore, the heating temperature during the alloying heat treatment is preferably limited to 670° C. to 900° C., more preferably 680° C. to 880° C., and most preferably 700° C. to 800° C.

Meanwhile, during the alloying heat treatment, the holding time may be limited to 1 to 20 seconds. In the present disclosure, the holding time refers to a time during which the heating temperature (including deviation ±10° C.) is maintained in the steel sheet. If the holding time is less than 1 second, the heating time is too short to achieve sufficient alloying. Meanwhile, if the holding time exceeds 20 seconds, productivity may be too low. Therefore, the holding time during the alloying heat treatment is preferably limited to 1 to 20 seconds, more preferably 1.5 to 18 seconds, and most preferably 1 to 10 seconds.

After completing the alloying as described above, hot press forming may be performed to manufacture a formed member. Here, hot press forming may use a method generally used in the art. For example, the aluminum-based plated steel sheet according to the present disclosure may be heated in a temperature range of 880° C. to 950° C. for 3 to 10 minutes, and the heated steel sheet may be hot press formed to have a desired shape using pressing, but the present disclosure is not limited thereto. In addition, a composition of the base steel sheet of the hot press formed member may be the same as a composition of the base steel sheet of the aluminum-based plated steel sheet described above.

MODE FOR INVENTION

Hereinafter, the present disclosure will be described more specifically by way of examples. It should be noted that the following examples are intended to illustrate the present disclosure in more detail and to not limit the scope of the present disclosure. The scope of the present disclosure may be determined by the matters described in the claims and the matters reasonably deduced therefrom.

EXAMPLE

First, a cold-rolled steel sheet for hot press forming having the composition of Table 1 below was prepared as a base steel sheet, and aluminum plating was performed on a surface of the base steel sheet with a plating bath composition shown in Table 2 and a plating bath temperature of 660° C. Thereafter, initial cooling and alloying heat treatment were performed under the conditions of initial cooling and alloying heat treatment shown in Table 2 below.

After the alloying heat treatment, cooling was performed and a structure of an alloyed plating layer of the aluminum-based plated steel sheet obtained by the above method was observed with an optical microscope or a scanning electron microscope (SEM) to check thicknesses of the plating layer and the alloying layer.

In addition, as for peeling of plating layers, a 3-point bending test was performed on a sample of 60 mm×60 mm using a punch having a diameter of 5 mm, and a plating layer, which was peeled off at a bending angle of 30°, was marked as X and a plating layer, which was not peeled off at the bending angle, was marked as O.

In addition, an oxygen content was measured with glow discharge spectrometry (GDS) (LECO's GDS-850A) at a depth of 0.1 μm from a surface of the plating layer, and is shown in Table 3 below.

TABLE 1

| Element | C | Si | Mn | Al | P | S | N | Cr | Ti | B |
|---|---|---|---|---|---|---|---|---|---|---|
| Content (%) | 0.22 | 0.20 | 1.15 | 0.03 | 0.01 | 0.002 | 0.0054 | 0.2 | 0.03 | 0.0025 |

TABLE 2

| Classification | Al plating condition | | | Initial cooling condition | | Alloying heat treatment condition | | Peeling of plating layer |
|---|---|---|---|---|---|---|---|---|
| | Plating amount (g/m2) | Si content (wt.%) | Mg content (wt.%) | Cooling termination temperature (° C.) | Cooling rate (° C./sec) | Temperature (° C.) | Time (sec.) | |
| Inventive Example 1 | 15 | 4.5 | — | 665 | 1.5 | 680 | 1.5 | ○ |
| Inventive Example 2 | 15 | 4.5 | — | 665 | 1.5 | 800 | 1.5 | ○ |
| Inventive Example 3 | 15 | 4.5 | — | 665 | 1.5 | 880 | 1.5 | ○ |
| Comparative Example 1 | 38 | 4.5 | — | 595 | 6.0 | 600 | 1.5 | X |
| Comparative Example 2 | 38 | 4.5 | — | 655 | 1.5 | 950 | 1.5 | ○ |
| Inventive Example 4 | 25 | 10.5 | — | 655 | 2.0 | 680 | 15 | ○ |
| Inventive Example 5 | 25 | 10.5 | — | 655 | 2.0 | 800 | 15 | ○ |
| Inventive Example 6 | 25 | 10.5 | — | 655 | 2.0 | 880 | 15 | ○ |
| Comparative Example 3 | 25 | 10.5 | — | 655 | 2.0 | 680 | 0.1 | X |
| Comparative Example 4 | 25 | 10.5 | — | 655 | 2.0 | 600 | 5 | X |
| Comparative Example 5 | 25 | 10.5 | — | 655 | 2.0 | 880 | 25 | ○ |
| Comparative Example 6 | 25 | 10.5 | — | 655 | 2.0 | 950 | 5 | ○ |
| Inventive Example 7 | 38 | 14.1 | 0.9 | 662 | 1.6 | 680 | 18 | ○ |
| Inventive Example 8 | 38 | 14.1 | 0.9 | 662 | 1.6 | 800 | 18 | ○ |
| Inventive Example 9 | 38 | 14.1 | 0.9 | 662 | 1.6 | 880 | 18 | ○ |
| Comparative Example 7 | 80 | 14.1 | 0.9 | 662 | 1.6 | 880 | 18 | X |
| Comparative Example 8 | 37 | 6.4 | 2.5 | 650 | 2.1 | 880 | 10 | ○ |
| Comparative Example 9 | 40 | 3.1 | — | 647 | 2.5 | 880 | 10 | ○ |

Each aluminum-based steel sheet was heated at 930° C. for 6 minutes in an atmospheric atmosphere and was subsequently subjected to hot press forming to obtain a hot press-formed member. Thereafter, a structure of a plating layer of the member was observed to measure a ratio of a thickness of a diffusion layer, and a content of diffusible hydrogen and spot weldability were measured, which are shown in Table 3 below. To measure the diffusible hydrogen content, a hydrogen content discharged by heating the sample was heated to 300° C. was measured using a gas chromatography technique, and spot weldability was evaluated based on ISO 18278 to analyze a current range.

TABLE 3

| Classification | Aluminum-based plated steel sheet | | | Hot press formed member | | |
|---|---|---|---|---|---|---|
| | Thickness of plating layer (μm) | Thickness of alloying layer (μm) | O at 0.1 μm depth (wt.%) | Ratio of thickness of alloying layer (%) | Ratio of thickness of diffusion layer (%) | Content of diffusible hydrogen (ppm) | Spot welding current range (kA) |
| Inventive Example 1 | 6.2 | 5.9 | 4.2 | 95 | 99 | 0.02 | 1.8 |

TABLE 3-continued

| | Aluminum-based plated steel sheet | | | | Hot press formed member | | |
|---|---|---|---|---|---|---|---|
| Classification | Thickness of plating layer (μm) | Thickness of alloying layer (μm) | O at 0.1 μm depth (wt.%) | Ratio of thickness of alloying layer (%) | Ratio of thickness of diffusion layer (%) | Content of diffusible hydrogen (ppm) | Spot welding current range (kA) |
| Inventive Example 2 | 6.5 | 6.3 | 4.7 | 97 | 100 | 0.01 | 2.0 |
| Inventive Example 3 | 7.1 | 7 | 5.5 | 99 | 100 | 0.01 | 1.8 |
| Comparative Example 1 | 5.5 | 4.2 | 2.1 | 76 | 82 | 0.15 | 1.8 |
| Comparative Example 2 | 10.4 | 10.4 | 15.1 | 100 | 100 | 0.02 | 0.4 |
| Inventive Example 4 | 10.5 | 10.4 | 4.1 | 99 | 100 | 0.02 | 1.8 |
| Inventive Example 5 | 12.1 | 12.1 | 4.5 | 100 | 100 | 0.01 | 1.6 |
| Inventive Example 6 | 15.8 | 15.8 | 5.4 | 100 | 100 | 0.02 | 1.6 |
| Comparative Example 3 | 10.3 | 9.1 | 3.4 | 88 | 98 | 0.03 | 1.6 |
| Comparative Example 4 | 9.7 | 4.5 | 2.1 | 46 | 65 | 0.26 | 1.8 |
| Comparative Example 5 | 21.1 | 21.1 | 9.4 | 100 | 100 | 0.02 | 0.8 |
| Comparative Example 6 | 25.1 | 25.1 | 11.8 | 100 | 100 | 0.02 | 0.4 |
| Inventive Example 7 | 16.4 | 15.1 | 5.8 | 92 | 99 | 0.02 | 2.0 |
| Inventive Example 8 | 18.1 | 17.4 | 6.5 | 96 | 100 | 0.01 | 1.8 |
| Inventive Example 9 | 19.5 | 19.4 | 7.4 | 99 | 100 | 0.02 | 1.6 |
| Comparative Example 7 | 30.8 | 19.5 | 7.2 | 63 | 37 | 0.17 | 1.4 |
| Comparative Example 8 | 15.6 | 15.6 | 14.2 | 100 | 100 | 0.005 | 0.2 |
| Comparative Example 9 | 22.7 | 22.7 | 7.5 | 100 | 100 | 0.01 | 0.6 |

As can be seen in Tables 1 to 3, Inventive Examples 1 to 9 satisfied all of the aluminum plating conditions, plating layer and aluminum layer thickness conditions, and alloying heat treatment conditions presented in the present disclosure, in which a ratio of a thickness of the diffusion layer in the member was 90% or more, and accordingly, the content of diffusible hydrogen in the member was 0.1 ppm or less, and the spot welding current range satisfied 1 kA or more, confirming that the hydrogen delayed fracture characteristics and spot weldability are excellent.

In contrast, in Comparative Example 1, the initial cooling was excessive outside the scope of the present disclosure, and accordingly, alloying heat treatment was performed at a low temperature of lower than 670° C., resulting in insufficient alloying. As a result, peeling of the plating layer was observed, and the content of diffusible hydrogen in the member exceeded 0.1 ppm. Meanwhile, Comparative Example 2 was a case in which the alloying heat treatment temperature was too high, alloying was sufficiently performed, but the oxygen content of a surface layer was too high, and spot weldability was poor. Meanwhile, Comparative Examples 3 to 6 are cases in which the alloying heat treatment temperature or time is out of the scope of the present disclosure. In Comparative Examples 3 and 4, the alloying heat treatment temperature was low or the time was insufficient, peeling of the plating layer was observed, and alloying did not occur sufficiently, so that a thickness of the aluminum layer was formed to be 10% or more of a thickness of the plating layer. Comparative Examples 5 and 6 were cases in which excessive alloying heat treatment was performed, and it can be seen that sufficient alloying was performed but spot weldability is poor.

Comparative Example 7 is a case in which aluminum was plated with an excessive plating amount, and the plating layer was too thick so that alloying was not sufficiently performed. Thus, the diffusible hydrogen content was increased and hydrogen embrittlement resistance was decreased.

Meanwhile, Comparative Example 8 is a case in which the Mg content was excessively added, and it can be seen that a large amount of Mg oxide was generated on the surface, so that the oxygen content of the surface layer was measured to be high, and spot weldability was very poor as 0.2 kA. In addition, Comparative Example 9 was a case in which the Si content was insufficient, and the alloying layer was formed thick, and spot weldability was also poor.

While exemplary embodiments of the present disclosure have been shown and described, it will be apparent to those skilled in the art that modifications and variations could be made without departing from the scope of the present invention. Therefore, the scope of the present invention is not limited to the embodiments but should be defined by the appended claims and equivalents thereof.

DETAILED DESCRIPTION OF MAIN ELEMENTS

1: HEAT TREATMENT FURNACE
2: ALUMINUM PLATING BATH
3: INITIAL COOLING DEVICE
4: ALLOYING HEAT TREATMENT DEVICE

The invention claimed is:

1. An aluminum-based plated steel sheet comprising:
a base steel sheet; and
a plating layer formed on a surface of the base steel sheet, wherein the plating layer comprises:
an alloying layer formed on the surface of the base steel sheet and comprising at least one of $Fe_3Al$, FeAl(Si), $Fe_2Al_5$, and $FeAl_3$; and
an aluminum layer formed on the alloying layer and having a thickness more than 0% and less than 5% of a thickness of the plating layer, the thickness of the plating layer is 5 μm or more and less than 10 μm; and
oxygen measured by GDS (Glow Discharge Spectrometer) at a depth of 0.1 μm from a surface of the plating layer is 10 wt % or less based on a total weight of the plated layer.

2. The aluminum-based plated steel sheet of claim 1, wherein the plating layer includes, by wt % based on the total weight of the plating layer, more than 4% and 15% or less of silicon (Si), a balance of aluminum (Al), and other inevitable impurities when an alloy composition excluding an iron (Fe) content diffused from the base steel sheet is 100%.

3. The aluminum-based plated steel sheet of claim 2, wherein the plating layer additionally includes, by wt % based on the total weight of the plating layer, 1.1% or less of Mg.

4. The aluminum-based plated steel sheet of claim 2, wherein the plating layer additionally includes, by wt % based on the total weight of the plating layer, 0.9% or less of Mg.

5. The aluminum-based plated steel sheet of claim 2, wherein the plating layer additionally includes, by wt % based on the total weight of the plating layer, 0.1% or less of Mg.

6. The aluminum-based plated steel sheet of claim 1, wherein the base steel sheet includes, by wt % based on a total weight of the base steel sheet, 0.04% to 0.5% of carbon (C), 0.01% to 2% of silicon (Si), 0.01% to 10% of manganese (Mn), 0.001% to 1.0% of aluminum (Al), 0.05% or less of phosphorus (P), 0.02% or less of sulfur(S), 0.02% or less of nitrogen (N), a balance of iron (Fe), and other inevitable impurities.

7. The aluminum-based plated steel sheet of claim 6, wherein the base steel sheet further includes one or more of 0.01% to 4.0% of a sum of one or more selected from the group consisting of chromium (Cr), molybdenum (Mo), and tungsten (W); 0.001% to 0.4% of a sum of one or more selected from the group consisting of titanium (Ti), niobium (Nb), zirconium (Zr), and vanadium (V); 0.005% to 2.0% of copper (Cu)+nickel (Ni); 0.001% to 1.0% of antimony (Sb)+tin (Sn); and 0.0001% to 0.01% of boron (B).

8. The aluminum-based plated steel sheet of claim 1, wherein the thickness of the plating layer is 5 μm to 7.1 μm.

9. The aluminum-based plated steel sheet of claim 1, wherein the aluminum layer is mainly formed of aluminum.

10. A hot press formed member obtained by hot press forming the aluminum-based plated steel sheet of claim 1, wherein a diffusion layer consisted of at least one of FeAl (Si) and $Fe_3Al$ is formed on the base steel sheet and a thickness of the diffusion layer is 90% or more of an entire thickness of the plating layer.

11. The hot press formed member of claim 10, wherein a content of diffusible hydrogen in the hot press formed member is 0.1 ppm or less, and a spot welding current range of the hot press formed member is 1 kA or more.

* * * * *